Patented Dec. 29, 1942

2,306,669

UNITED STATES PATENT OFFICE 2,306,669

VULCANIZATION OF RUBBER

Bernard M. Sturgis, Pitman, N. J., assignor to E. I. du Pont de Nemours & Company, Wilmington, Del., a corporation of Delaware No Drawing. Application November 12, 1940, Serial No. 365,328

18 Claims. (Cl. 260—787)

This invention relates to the vulcanization of rubber, and more particularly to the acceleration of the vulcanization of rubber by means of 2-mercapto-thiazolines in combination with activators therefor.

It is well known that the cures obtainable by the use of many basic and neutral organic accelerators, such as meta-phenylene diamine and urea can be improved by employing in addition thereto small amounts of various organic acids. This is disclosed in U. S. Patent No. 1,467,197 to Russell. It is also well known that acidic accelerators such as 2-mercapto-benzothiazole behave differently. The action of such acidic type of accelerator is generally retarded rather than activated by aromatic carboxylic acids and by most aliphatic carboxylic acids. Morton, in U. S. Patent No. 1,929,561, discloses and claims the use of aromatic carboxylic acids as retarders for acidic accelerators. Thies, in U. S. Patent No. 2,058,840, discloses that many aliphatic carboxylic acids retard the action of acidic accelerators such as 2-mercaptobenzothiazole. Cadwell, in U. S. Patent No. 1,871,037, also discloses some aliphatic carboxylic acids as retarders for 2-mercapto-benzothiazole and other acidic accelerators.

2-mercapto-thiazoline has the formula

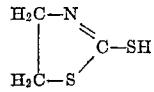

It readily forms salts with amines and alkalies, and in general exhibits the reactions of an acidic compound. 2-mercapto-thiazoline and some of its homologues have been proposed for use as accelerators for the vulcanization of rubber. However, 2-mercapto-thiazolines have not been employed commercially until very recently since they were very weak accelerators. Recently, the applicant and his associates have discovered methods of rendering 2-mercapto-thiazolines active so that they are commercially valuable accelerators.

It is an object of the present invention to provide a new and improved method of vulcanizing rubber whereby vulcanized rubber of improved properties is produced. Another object is to increase the activity of 2-mercapto-thiazolines as accelerators for the vulcanization of rubber. A further object is to provide a new combination of compounds for accelerating the vulcanization of rubber. A still further object is to accelerate the vulcanization of rubber with 2-mercapto-thiazolines, employing, in combination with 2-mercapto-thiazolines, compounds which render the 2-mercapto-thiazolines extremely active at the normal vulcanization temperatures without unduly activating the 2-mercapto-thiazolines at the usual processing temperatures. Other objects are to provide new compositions of matter and to advance the art. Still other objects will appear hereinafter.

The above and other objects may be accomplished in accordance with my invention which comprises accelerating the vulcanization of rubber with a combination of a 2-mercapto-thiazoline and, as an activator therefor, at least one aliphatic carboxylic acid. I have found that the 2-mercapto-thiazolines are affected entirely differently than are other acidic accelerators, such as 2-mercapto-benzothiazole, by certain aliphatic carboxylic acids. While the accelerating action of 2-mercapto-benzothiazole is retarded by most aliphatic carboxylic acids, especially at temperatures below 260° F., 2-mercapto-thiazoline, on the other hand, is greatly activated by such acids at all temperatures. This activation of 2-mercapto-thiazoline is very much greater at the higher curing temperatures than at lower temperatures so that the rubber stocks containing it may be readily processed without danger of "scorching" or prevulcanization. Therefore, by employing aliphatic carboxylic acids in combination with 2-mercapto-thiazolines, fast curing, high modulus stocks can be prepared which show no reversion and which have excellent physical properties. Such stocks show particularly excellent resistance toward aging and high temperature deterioration.

The 2-mercapto-thiazolines which are to be employed in accordance with my invention are selected from the class of 2-mercapto-thiazoline, C-alkyl 2-mercapto-thiazolines, C-hydroxyalkyl 2-mercapto-thiazolines, and salts of such 2-mercapto-thiazolines. The numbering of the ring of 2-mercapto-thiazoline is as follows—

$$\begin{array}{c} H \\ | \\ H-C-N \\ |\phantom{-}4\phantom{-}\diagdown \\ |\phantom{-}5\phantom{-}\phantom{-}C-SH \\ H-C-S\phantom{-}/\phantom{-}2 \\ |\phantom{-}1 \\ H \end{array}$$

By the term "C-alkyl 2-mercapto-thiazolines" I mean 2-mercapto-thiazoline in which one or more of the hydrogens in the 4 and 5 positions have been substituted by alkyl groups only. By the term "C-hydroxyalkyl 2-mercapto-thiazolines" I mean 2-mercapto-thiazolines in which at least one hydrogen in the 4 and 5 positions has been substituted by a hydroxyalkyl radical and in which one or more of the remaining hydrogens may be substituted by alkyl radicals. By such terms I intend to exclude substituents other than alkyl and hydroxyalkyl groups. By an "alkyl group I mean an aliphatic hydrocarbon group. All of such 2-mercapto-thiazolines will be materially activated by the aliphatic carboxylic acids of my invention.

The aliphatic carboxylic acids which may be employed in accordance with my invention to activate the 2-mercapto-thiazolines are selected from the group of unsubstituted aliphatic monocarboxylic acids and substituted aliphatic monocarboxylic acids in which the substituents consist of from 1 to 3 members of the group of aryl, aryloxy, alkoxy, amino and hydrocarbon substituted amino groups. By the term "unsubstituted aliphatic monocarboxylic acids" I mean those acids which, except for the oxygen of the carboxyl group, consist of carbon and hydrogen and contain no aromatic or benzene rings. By the term "aryl" I mean an aromatic hydrocarbon radical. By the term "hydrocarbon substituted amino" group I mean an amino group in which one or more of the amino hydrogens have been substituted by a hydrocarbon radical only.

While the broad class of aliphatic monocarboxylic acids recited in the last preceding paragraph may be employed in accordance with my invention, I preferably employ the aliphatic monocarboxylic acids which, except for the oxygen of the COOH or carboxyl group, consist of carbon and hydrogen. Of such acids I prefer to employ the unsubstituted aliphatic monocarboxylic acids and particularly the unsubstituted long chain aliphatic monocarboxylic acids such as stearic acid. By a "long chain" aliphatic acid I mean that the acid contains at least 10 carbon atoms.

While the individual acids are quite useful in accordance with my invention, mixtures of two or more acids may also be employed. I have found that particularly desirable results are obtained when stearic acid is employed, in combination with one or more of the other acids of my invention, and particularly with the acids containing from 2 to 8 carbon atoms. Among the acids to be employed in accordance with my invention, the following have been found to be particularly desirable and effective.

Cyclohexanoic acid $$\begin{array}{c} H\phantom{H}H\phantom{H}H\phantom{H}H \\ H\diagdown\phantom{H}|\phantom{H}|\phantom{H}/H \\ \phantom{H}\diagup\phantom{H}\diagdown \\ H\diagup\phantom{H}\phantom{H}\diagdown COOH \\ H\phantom{H}H\phantom{H}H\phantom{H}H \end{array}$$

Capric acid $$CH_3-(CH_2)_8-COOH$$

Heptanoic acid $$CH_3-(CH_2)_5-COOH$$

Caprylic acid $$CH_3-(CH_2)_6-COOH$$

Caproic acid $$CH_3-(CH_2)_4-COOH$$

Crotonic acid $$C_3H_5-COOH$$

Phenyl acetic acid $$\langle\phantom{}\rangle-CH_2-COOH$$

Stearic acid $$CH_3-(CH_2)_{16}-COOH$$

Propionic acid $$CH_3-CH_2-COOH$$

Phenoxy acetic acid $$\langle\phantom{}\rangle-O-CH_2-COOH$$

The aliphatic monocarboxylic acids of my invention will generally be employed in the proportion of from about 0.05 part to 10 parts for each part of the 2-mercapto-thiazoline, and preferably in the proportion of from about 0.5 part to about 4 parts of the acid for each part of the 2-mercapto-thiazoline accelerator. When other acids are employed with stearic acid, it will generally be preferred to employ from about 0.05 to about 5 parts of the other acid to each part of the stearic acid, and preferably from about 0.1 to about 3 parts of the other acid for each part of the stearic acid. When such mixtures of acids are employed, the total amounts of acid should fall within the range of from about 0.05 to about 10 parts for each part of the 2-mercapto-thiazoline.

In order to illustrate my invention more clearly, the preferred modes of carrying the same into effect, and the advantageous results to be obtained thereby, the results of the following tests are submitted.

| Stock | A | B | C | D | E | F | G | H |
|---|---|---|---|---|---|---|---|---|
| Smoked sheets | 100 | 100 | 100 | 100 | 100 | 100 | 100 | 100 |
| Zinc oxide | 10 | 10 | 10 | 10 | 10 | 10 | 10 | 10 |
| Sulfur | 3 | 3 | 3 | 3 | 3 | 3 | 3 | 3 |
| 2-mercapto-thiazoline | 1.0 | 0.85 | 0.85 | 0.85 | 0.85 | 0.85 | 0.85 | 0.85 |
| Cyclohexanoic acid | | 3 | | | | | | |
| Capric acid | | | 3 | | | | | |
| Heptanoic acid | | | | 3 | | | | |
| Caprylic acid | | | | | 3 | | | |
| Caproic acid | | | | | | 3 | | |
| Crotonic acid | | | | | | | 3 | |
| Phenyl acetic acid | | | | | | | | 2 |

Table I

| Temp. cure | Min. cure | Stock A | Stock B | Stock C | Stock D | Stock E | Stock F | Stock G | Stock H |
|---|---|---|---|---|---|---|---|---|---|
| MODULUS AT 600% ELONGATION LBS./SQ. IN. | | | | | | | | | |
| 274° F | 20 | 125 | 1025 | 1050 | 975 | 950 | 925 | 700 | 1100 |
| | 30 | 200 | 1725 | 1400 | 1500 | 1425 | 1175 | 1075 | 1700 |
| | 60 | 325 | 2850 | 2475 | 2500 | 2475 | 2175 | 1600 | 2375 |
| | 90 | 425 | 3275 | 2850 | 2825 | 3075 | 2725 | 1775 | 2500 |
| TENSILE AT BREAK LBS./SQ. IN. | | | | | | | | | |
| 274° F | 20 | 325 | 3250 | 3900 | 3575 | 3600 | 3375 | 2800 | 3725 |
| | 30 | 875 | 4400 | 4025 | 3725 | 4275 | 3900 | 3250 | 3675 |
| | 60 | 1875 | 4525 | 3675 | 4900 | 5125 | 4275 | 4625 | 4175 |
| | 90 | 2125 | 3975 | 3350 | 4400 | 4350 | 3825 | 4175 | 3825 |

It can be seen that these acids tremendously activate the cure given by 2-mercapto-thiazoline, often increasing the modulus and tensile figures to eight times their former value. Many of these same acids are disclosed by Thies, in U. S. Patent No. 2,058,840, as being retarders for mercapto-benzothiazole and other acidic accelerators.

Three long chain aliphatic carboxylic acids, namely stearic acid, palmitic acid, and lauric acid, have been found to activate mercapto-benzothiazole and other acidic accelerators, as well as 2-mercapto-thiazoline. The activation given to mercapto-benzothiazole by such acids is relatively slight. However, when stearic acid is employed with 2-mercapto-thiazoline, the modulus and tensile figures are increased to many times their original value. 2-mercapto-thiazoline, in the absence of an acid, gives such poor cures that the resulting vulcanizates are of no industrial importance. The presence of a small amount of an aliphatic carboxylic acid of my invention, however, so raises the moduli and tensiles of the vulcanizates that they become extremely valuable.

In order to illustrate the vast differences in cure, obtainable with 2-mercapto-thiazoline and 2-mercapto-benzothiazole in the absence of an acidic substance the following stocks were prepared.

| Stock | J | K |
|---|---|---|
| Smoked sheets | 100 | 100 |
| Zinc oxide | 10 | 10 |
| Sulfur | 3 | 3 |
| 2-mercapto-thiazoline | 1 | |
| Mercaptobenzothiazole | | 1 |

Results of tests on these stocks appear in Table II.

Table II

| Min. cured | Temp. cured | Modulus at 600% elongation lbs./sq. in. | | Tensile at break lbs./sq. in. | |
|---|---|---|---|---|---|
| | | Stock J | Stock K | Stock J | Stock K |
| 20 | 274° F | 125 | 825 | 325 | 2875 |
| 30 | 274° F | 200 | 900 | 875 | 2800 |
| 45 | 274° F | 275 | 825 | 1550 | 3025 |
| 60 | 274° F | 325 | 775 | 1875 | 3375 |

While mercaptobenzothiazole produces good moduli and tensiles, in the absence of acids, and gives commercially important vulcanizates, the 2-mercapto-thiazoline gives little cure in such stock and such stock is useless for commercial uses.

If stearic acid is added to the above stocks, the modulus and tensile figures are increased a relatively small amount, in the case of the mercaptobenzothiazole stock, but, in the case of the 2-mercapto-thiazoline stock, these figures are increased many times. 2-mercapto-thiazoline is thus transformed from an accelerator of no importance to one of the most desirable accelerators of vulcanization known today. It exceeds even mercaptobenzothiazole in modulus and tensile characteristics while retaining good processing safety. These facts are illustrated by the following tests which were carried out on stocks of the same formula as J and K to which three parts of stearic acid had been added. These new stocks were lettered L and M respectively.

Table III

| Min. cured | Temp. cured | Modulus at 600% elongation lbs./sq. in. | | Tensile at break lbs./sq. in. | |
|---|---|---|---|---|---|
| | | Stock L | Stock M | Stock L | Stock M |
| 20 | 274° F | 1625 | 1025 | 3950 | 3775 |
| 30 | 274° F | 1800 | 1450 | 4125 | 4100 |
| 45 | 274° F | 2225 | 1600 | 4325 | 3875 |
| 60 | 274° F | 2550 | 1775 | 4025 | 3575 |
| 60 | 227° F | 525 | 700 | 2400 | 3475 |

Even with this tremendous amount of activation at curing temperatures, the 2-mercapto-thiazoline stock still remains safer at processing temperatures than the mercaptobenzothiazole stock. It can be seen, therefore, that entirely unexpected results are obtained when aliphatic carboxylic acids are employed in conjunction with 2-mercapto-thiazoline in the vulcanization of rubber.

Not only are the individual aliphatic carboxylic acids useful as activators for 2-mercapto-thiazoline, but they are also useful in combination with each other, and particularly combinations of the other acids of my invention with stearic acid. I have, indeed, found that very beneficial and unexpected results are obtained when a small amount of another aliphatic carboxylic acid of my invention is added to a rubber stock, accelerated with 2-mercapto-thiazoline and containing from 0.5 to 4% of stearic acid. The activating effect, produced by the combination of acids, is not merely additive. The presence of even a small amount of certain aliphatic carboxylic acids seem to exert a strong activating effect on 2-mercapto-thiazoline in the presence of stearic acid that is entirely out of proportion to the amount used. The addition of even 0.3 part of certain aliphatic carboxylic acids to a 2-mercapto-thiazoline stock, containing say 2 parts of stearic acid, often increases the modulus as much as 30–40%. This effect is all the more remarkable since these same acids, when used with mercaptobenzothiazole and other similar acidic accelerators in the presence of stearic acid, have a retarding, rather than an activating effect. The remarkable activating effect, produced on 2-mercapto-thiazoline, is illustrated in Table IV which gives the results of tests on the following rubber stocks.

| Stock | N | O | P | Q | R | S |
|---|---|---|---|---|---|---|
| Smoked sheets | 100 | 100 | 100 | 100 | 100 | 100 |
| Zinc oxide | 5 | 5 | 5 | 5 | 5 | 5 |
| Sulfur | 3 | 3 | 3 | 3 | 3 | 3 |
| Stearic acid | 2 | 2 | 2 | 2 | 2 | 2 |
| 2-mercapto-thiazoline | 0.85 | 0.85 | 0.85 | 0.85 | 0.85 | 0.85 |
| Phenyl acetic acid | | 0.3 | | | | |
| Propionic acid | | | 0.3 | | | |
| Caprylic acid | | | | 0.3 | | |
| Caproic acid | | | | | 0.3 | |
| Capric acid | | | | | | 0.3 |

These stocks were cured for periods of 30, 60 and 90 minutes at 274° F. and the vulcanizates tested with the following results:

*Table IV*

MODULUS AT 600% ELONGATION LBS./SQ. IN.

| Min. cured | Temp. cured | Stock N | Stock O | Stock P | Stock Q | Stock R | Stock S |
|---|---|---|---|---|---|---|---|
| 30 | 274° F | 1100 | 1575 | 1325 | 1525 | 1300 | 1275 |
| 60 | 274° F | 1300 | 2100 | 1800 | 2050 | 1750 | 1725 |
| 90 | 274° F | 1500 | 2275 | 2050 | 2050 | 1975 | 1950 |

Although this activation of 2-mercapto-thiazoline, by small amounts of certain aliphatic carboxylic acids in the presence of stearic acid, is also present in the shorter cures at ordinary vulcanizing temperatures, the activation at processing temperatures is slight and the stocks retain their processing safety.

In order to demonstrate that other acidic accelerators are retarded, rather than activated, by a similar combination of acids, the following tests were made.

| Stock | T | U | V | W | X | Y | Z |
|---|---|---|---|---|---|---|---|
| Smoked sheets | 100 | 100 | 100 | 100 | 100 | 100 | 100 |
| Zinc oxide | 5 | 5 | 5 | 5 | 5 | 5 | 5 |
| Sulfur | 3 | 3 | 3 | 3 | 3 | 3 | 3 |
| Stearic acid | 2 | 2 | 2 | 2 | 2 | 2 | 2 |
| Mercaptobenzothiazole | 0.85 | 0.85 | 0.85 | 0.85 | 0.85 | 0.85 | 0.85 |
| Beta-chloropropionic acid | | 0.3 | | | | | |
| Phenoxy acetic acid | | | 0.3 | | | | |
| Crotonic acid | | | | 0.3 | | | |
| Phenyl acetic acid | | | | | 0.3 | | |
| Caprylic acid | | | | | | 0.3 | |
| Caproic acid | | | | | | | 0.3 |

*Table V*

MODULUS AT 600% ELONGATION LBS./SQ. IN.

| Min. cured | Temp. cured | Stock T | Stock U | Stock V | Stock W | Stock X | Stock Y | Stock Z |
|---|---|---|---|---|---|---|---|---|
| 20 | 274° F | 950 | 625 | 825 | 875 | 875 | 900 | 925 |
| 30 | 274° F | 1125 | 775 | 1075 | 1075 | 1100 | 1100 | 1125 |

It can be seen that no activation is present in the case of any of the stocks in Table V.

2-mercapto-thiazoline is therefore unique in its ability to be so activated by most aliphatic carboxylic acids. This activation is very important in that it permits the compounding of stocks that are very desirable commercially. These stocks give a fast, high modulus cure, and at the same time process without difficulty. Furthermore, these vulcanizates, prepared according to my invention, possess excellent resistance to aging, heat deterioration, abrasion, and tear.

Although certain definite combinations of accelerators with aliphatic carboxylic acids have been shown, these combinations are illustrative rather than limiting. A great many 2-mercapto-thiazolines may be used as accelerators with equally good results. These include substituted 2-mercapto-thiazoline in which the substituted groups are alkyl groups or hydroxyalkyl groups substituted for one or both of the hydrogen atoms in the 4 or 5, or both the 4 and 5, positions of the ring in the formula

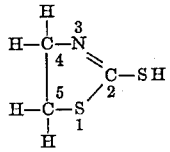

such as, for example 4-methyl 2-mercapto-thiazoline
4-ethyl 2-mercapto-thiazoline
4-propyl 2-mercapto-thiazoline
4,4-dimethyl 2-mercapto-thiazoline
5,5-dimethyl 2-mercapto-thiazoline
4-methyl-4-ethyl 2-mercapto-thiazoline
4-methyl-5-propyl 2-mercapto-thiazoline
4-isopropyl-5-propyl 2-mercapto-thiazoline
4-ethyl-5-propyl 2-mercapto-thiazoline
4-methyl-5-hydroxy-methyl 2-mercapto-thiazoline
4-methyl-4-ethyl-5-propyl 2-mercapto-thiazoline
4-ethyl-5-methyl 2-mercapto-thiazoline
4-propyl-5-propyl 2-mercapto-thiazoline
4,5-dimethyl 2-mercapto-thiazoline
5-methyl 2-mercapto-thiazoline
4-hydroxy-methyl 2-mercapto-thiazoline
4,4,5,5-tetramethyl 2-mercapto-thiazoline Also, various metal salts of these 2-mercapto-thiazolines may be used with equal effectiveness. These include, among others, Lead salt of 2-mercapto-thiazoline
Zinc salt of 2-mercapto-thiazoline Cadmium salt of 2-mercapto-thiazoline
Iron salt of 2-mercapto-thiazoline
Zinc salt of 4-methyl 2-mercapto-thiazoline
Cadmium salt of 4-methyl 2-mercapto-thiazoline
Zinc salt of 4-ethyl 2-mercapto-thiazoline
Lead salt of 5-propyl 2-mercapto-thiazoline
Cadmium salt of 4,4-dimethyl 2-mercapto-thiazoline
Iron salt of 5,5-dimethyl 2-mercapto-thiazoline
Zinc salt of 4-methyl-4-ethyl 2-mercapto-thiazoline
Cadmium salt of 4,4-dimethyl-5-propyl 2-mercapto-thiazoline
Zinc salt of 4-hydroxy-methyl 2-mercapto-thiazoline
Zinc salt of 4,4,5,5-tetra-methyl 2-mercapto-thiazoline Other aliphatic monocarboxylic acids may be employed in place of those given in the above tests. The following are representative of the acids which may be employed in accordance with my invention.

Stearic acid
Palmitic acid
Oleic acid
Linoleic acid
Caprylic acid
Capric acid
Caproic acid
Valeric acid
Heptanoic acid
Butyric acid
Propionic acid
Acetic acid
Isobutyric acid
Isovaleric acid
2-methyl stearic acid
Phenyl acetic acid
Phenyl propionic acid
Naphthyl acetic acid
Naphthyl stearic acid
Crotonic acid
Methoxy acetic acid
Ethoxy acetic acid
Phenoxy acetic acid
Naphthoxy acetic acid
Methoxy isobutyric acid
Methoxy stearic acid
Amino acetic acid
N-phenyl amino propionic acid
N-methyl amino stearic acid
Gamma-methoxy alpha-amino caproic acid Also, the composition of the mixes may be widely varied by the use of compounding ingredients, fillers, and the like, other than those shown in the test formulae and in other proportions.

It will be apparent that by my invention I have converted the 2-mercapto-thiazolines from weak, commercially undesirable accelerators to very active accelerators of great commercial value which will produce fast, high modulus cures with no reversion and great processing safety. While the 2-mercapto-thiazolines have been rendered extremely active at the normal vulcanizing temperatures they have not been activated to an objectionable extent at the lower processing temperatures and hence the rubber stocks containing them may be processed with safety. By my invention I have made it possible to obtain vulcanized rubber having exceedingly good resistance toward tear, abrasion, and flex-cracking as well as excellent resistance toward deterioration by heat or oxidation.

I claim:
1. Rubber, having incorporated therein, prior to vulcanization, a small proportion of 2-mercapto-thiazoline, and a small proportion of at least one aliphatic monocarboxylic acid which, except for the oxygen of the COOH group, consists of carbon and hydrogen.

2. Rubber, having incorporated therein, prior to vulcanization, a small proportion of 2-mercapto-thiazoline, and a small proportion of at least one unsubstituted aliphatic monocarboxylic acid.

3. Rubber, having incorporated therein, prior to vulcanization, a small proportion of 2-mercapto-thiazoline, and a small proportion of stearic acid.

4. Rubber, having incorporated therein, prior to vulcanization, a small proportion of 2-mercapto-thiazoline, and a small proportion of stearic acid and a small proportion of at least one other aliphatic monocarboxylic acid which, except for the oxygen of the COOH group, consists of carbon and hydrogen.

5. Rubber, having incorporated therein, prior to vulcanization, a small proportion of 2-mercapto-thiazoline, and a small proportion of stearic acid and a small proportion of phenyl acetic acid.

6. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of at least one activator of the group consisting of aliphatic monocarboxylic acids which, except for the oxygen of the COOH group, consist of carbon and hydrogen and aliphatic monocarboxylic acids which contain from 1 to 3 members of the group consisting of aryl, aryloxy, alkoxy, amino and hydrocarbon substituted amino groups and otherwise consist of carbon, hydrogen and the oxygen of the COOH group.

7. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of at least one aliphatic monocarboxylic acid which, except for the oxygen of the COOH group, consists of carbon and hydrogen.

8. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mecapto-thiazolines and metal salts of such 2-mercapto-thiazolines in which all of the valences of the metals are satisfied by 2-thio-thiazoline radicals, and a small proportion of at least one unsubstituted aliphatic monocarboxylic acid.

9. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazolines radicals, and a small proportion of at least one unsubstituted long chain aliphatic monocarboxylic acid.

10. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid.

11. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of an unsubstituted long chain aliphatic monocarboxylic acid and a small proportion of at least one other aliphatic monocarboxylic acid which, except for the oxygen of the COOH group, consists of carbon and hydrogen.

12. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid and a small proportion of at least one other aliphatic monocarboxylic acid which, except for the oxygen of the COOH group, consists of carbon and hydrogen.

13. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid and a small proportion of at least one other aliphatic monocarboxylic acid containing from 2 to 8 carbon atoms and which, except for the oxygen of the COOH group, consists of carbon and hydrogen.

14. Rubber, having incorporated therein, prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid and a small proportion of an aryl aliphatic monocarboxylic acid which, except for the oxygen of the COOH group, consists of carbon and hydrogen.

15. Rubber, having incorporated therein, prior to vulcanization, a small proportion of a vulcanzation accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid and a small proportion of phenyl acetic acid.

16. Rubber, having incorporated therein, prior to vulcanization, small proportion of 2-mercapto-thiazoline, and a small proportion of at least one activator of the group consisting of aliphatic monocarboxylic acids which, except for the oxygen of the COOH group, consist of carbon and hydrogen and aliphatic monocarboxylic acids which contain from 1 to 3 members of the group consisting of aryl, aryloxy, alkoxy, amino and hydrocarbon substituted amino groups and otherwise consist of carbon, hydrogen and the oxygen of the COOH group.

17. The method of vulcanizing rubber which comprises incorporating in a rubber mix a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of at least one activator of the group consisting of aliphatic monocarboxylic acids which, except for the oxygen of the COOH group, consist of carbon and hydrogen and aliphatic monocarboxylic acids which contain from 1 to 3 members of the group consisting of aryl, aryloxy, alkoxy, amino and hydrocarbon substituted amino groups and otherwise consist of carbon, hydrogen and the oxygen of the COOH group, and then subjecting the mix to vulcanizing temperatures.

18. The method of vulcanizing rubber which comprises incorporating in a rubber mix a small proportion of a vulcanization accelerator of the group consisting of 2-mercapto-thioazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of an unsubstituted long chain aliphatic monocarboxylic acid and a small proportion of at least one other aliphatic monocarboxylic acid which, except for the oxygen of the COOH group, consists of carbon and hydrogen.

BERNARD M. STURGIS.